United States Patent
Saeki et al.

(10) Patent No.: US 6,657,415 B2
(45) Date of Patent: Dec. 2, 2003

(54) PORTABLE APPARATUS

(75) Inventors: Mitsuo Saeki, Kawasaki (JP); Kouichi Matsuda, Kawasaki (JP); Hidekiyo Ozawa, Kawasaki (JP); Shigeo Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/930,151

(22) Filed: Aug. 16, 2001

(65) Prior Publication Data

US 2002/0097022 A1 Jul. 25, 2002

(30) Foreign Application Priority Data

Jan. 19, 2001 (JP) .......................... 2001-011561

(51) Int. Cl.⁷ .................................................. H02J 7/00
(52) U.S. Cl. ...................................... 320/125; 320/152
(58) Field of Search ................................. 320/125, 152, 320/157, 159, 160, 162, 164

(56) References Cited

U.S. PATENT DOCUMENTS

| 5,886,499 A | 3/1999 | Hall | 320/101 |
| 5,986,433 A | * 11/1999 | Peele et al. | 320/125 |
| 5,986,437 A | * 11/1999 | Lee | 320/162 |
| 6,154,010 A | * 11/2000 | Geiger | 320/137 |
| 6,204,633 B1 | * 3/2001 | Kitagawa | 320/128 |
| 6,337,560 B1 | * 1/2002 | Kalogeropoulos et al. | 320/160 |

FOREIGN PATENT DOCUMENTS

| EP | 1043824 A | 10/2000 |
| JP | 5-83874 | 4/1993 |
| JP | 8-140280 | 5/1996 |
| JP | 10051968 A | 8/1996 |
| JP | 9-84269 | 3/1997 |
| JP | 9-84271 | 3/1997 |
| JP | 10-201117 | 7/1998 |

* cited by examiner

Primary Examiner—Lawrence Luk
(74) Attorney, Agent, or Firm—Armstrong, Kratz, Quintos, Hanson & Brooks, LLP

(57) ABSTRACT

When starting charging of an internal battery as a result of connection of an external power source by an AC adapter, a charging control unit sets a first charging voltage at which the charging capacity of the internal battery is maximized. When starting the charging from recognition of reduced capacity of the internal battery due to its self-discharge in desk-top use where the AC adapter is in connection at all times, the charging control unit sets a second charging voltage lower than the first charging voltage to prevent the battery from degrading.

21 Claims, 7 Drawing Sheets

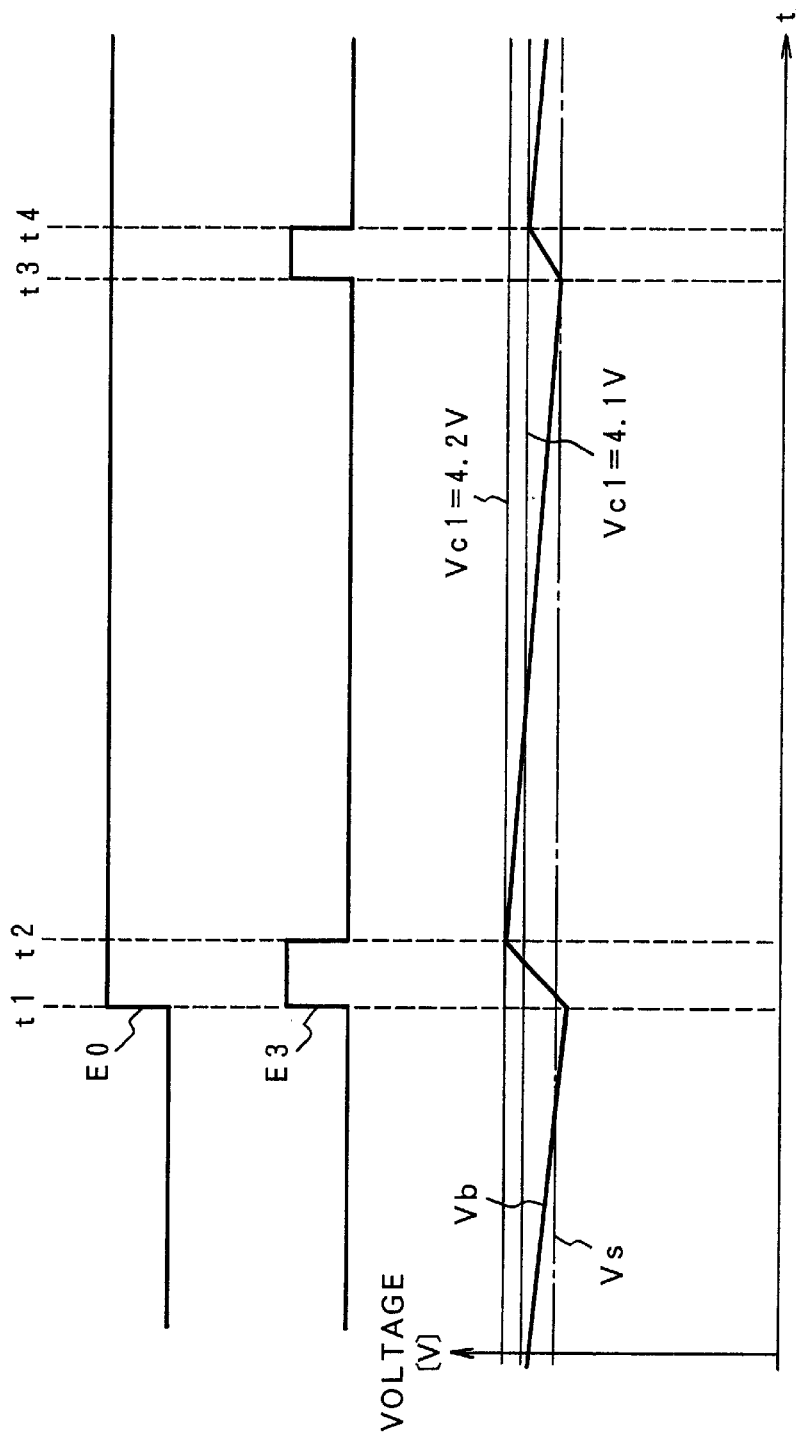

PORTABLE APPARATUS

BACKGROUND OF THE INVENTION

1. Field of the Invention

The present invention relates generally to a hand-held information processing apparatus which, upon connection with an external power source by way of, e.g., an AC adapter, supplies an electric power from an external power source to a load and charge an internal battery, and to a charging apparatus and method for the information processing apparatus. More particularly, the invention relates to a hand-held information processing apparatus for preventing degradation of the battery upon the use with the external power source being connected, as well as to a charging apparatus and method for the information processing apparatus.

2. Description of the Related Arts

With recent progress toward miniaturization of elements, high integration of LSIs and high performances of CPUs with enriched communication facilities such as cellular phones, personal computer communications and internets, markets for hand-held equipment such as notebook-sized personal computers, handy terminals, mobile computers, etc., are expanding. Use of a lithium ion battery (L+ battery) as the battery for such hand-held equipment is rapidly prevailing of late. The lithium ion battery has a weight energy density about three times and a volume energy density about twice the nickel-cadmium hydrogen battery. The lithium ion battery is a small-sized and lightweight high-capacity battery and is used for various hand-held equipment. The lithium ion battery includes, as its basic unit, battery cells generating nominal voltage of 3.6 volts and has a tubular or rectangular package for housing a corresponding number of cells to the power-supply voltage required by the hand-held terminals. For example, two cells and three cells correspond to 7.2 volts and 10.8 volts, respectively. The mode of charging the lithium ion battery loaded in the hand-held equipment such as the notebook-sized personal computers needs to be constant-voltage constant-current charge. In such battery charge, the quantity of charge is determined depending on the charging voltage, charging current and charging time. In case of the hand-held equipment such as the notebook-sized personal computers, the battery operating time becomes longer accordingly as the quantity of charge of the lithium ion battery, i.e., the capacity upon the full charge is larger. For this reason, the charging is made at as a high voltage as possible within a permissible range so as to secure a larger capacity upon the full charge. It is further necessary to set as a final discharge voltage a minimum voltage value ensuring a stable operation of the equipment, but the apparatus operation time may vary depending on the manner of setting the final discharge voltage. On the other hand, the lithium ion battery has degradation properties that its capacity lowers in the same manner as the case of the charge and discharge merely by being left to stand under the high-temperature environment in charged state. The degree of degradation depends on the temperature when it is left to stand and on the charging voltage, so that the degradation is faster accordingly as the temperature is higher. The notebook-sized personal computer may be used on the desk with the AC adapter connected at all time without being limited to the hand-held use. In this case, the notebook-sized personal computer is constantly powered from the AC adapter and is by no means powered by the internal battery. However, considering the abnormalities such as the short break, instantaneous stop and service interruption into consideration irrespective of the constant supply of power for the notebook-sized personal computer from the AC adapter, it is not preferable that the battery charge capacity is null. Furthermore, in the event that the hand-held use is suddenly desired in spite of the frequent desk-top use, the empty battery will not permit the hand-held use till the termination of the battery charging. In this manner, the charging capacity of the internal battery must be kept at the full charged state in proximity to 100% even in the cases where the notebook-sized personal computer is always used on top of the desk with the AC adapter connected.

Normally, upon the operation with the AC adapter connected, there is no supply of power from the internal battery to the apparatus, so that when the internal battery is once charged, the charging capacity will remain near-full charged close to 100% with no need for recharging. However, without limitation to the lithium ion battery, the secondary batteries may suffer a gradually decreasing charging capacity due to the internal leak even in its full-charged state. This is called self-discharge. Thus, even in the event that the apparatus such as the notebook-sized personal computer is operated with the AC adapter connected, it is necessary to make recharging to supplement the self-reduction of the charging capacity attributable to the self-discharge of the internal battery. In the case of Nicad battery or NiMH battery, a common method is the trickle charging in which the quantity equal to the self-discharge continues to be charged at all times. On the other hand, due to the presence of a risk that the battery may be damaged by the continuing trickle charging, the remaining quantity of the battery is monitored so that the charging is effected when the remainder has reduced to a certain degree, to thereby supplement the quantity of self-discharge. For this reason, the desk-top use of the notebook-sized personal computer with the AC adapter connected at all times allows the power to be supplied from the AC adapter to the load, so that although there is no discharge from the lithium ion battery, the lithium ion battery is always put in the full charged state, which may cause any degradation without charge and discharge for the load. Such a problem occurs similarly irrespective of its significance in not only the lithium ion battery but also in the other secondary battery such as lithium polymer battery. Raised charging voltage of the lithium ion secondary battery will increase the charging capacity and elongate the battery-based operating time of the notebook-sized personal computer in the hand-held use, whereas the raised charging voltage may cause the same degradation as the case of charge and discharge of the battery even in the cases where the battery is not discharged in the AC adapter-based operation. A prompt approach to solution of degradation of the battery in the high-temperature environment is to lower the charging voltage. The lowered battery charging voltage can prevent the degradation of the battery in the high-temperature environment, but may shorten the battery-based operating time of the notebook-sized personal computer due to the reduced quantity of battery charge.

SUMMARY OF THE INVENTION

According to the present invention there are provided a hand-held information processing apparatus, a charging apparatus and a charging method wherein when the apparatus such as a personal computer is in hand-held use, the charging voltage of the battery is raised to increase the charging capacity so that the battery operating time is maximized, whereas when the apparatus such as the personal computer is in desk-top use with the AC adapter connected at all times, the charging voltage of the battery is lowered to thereby prevent any degradation of the battery in high-temperature environment.

Identification of whether the apparatus such as the personal computer is in hand-held use or desk-top use can be made by identifying the trigger phenomenon upon the start of the charging of the battery incorporated in the apparatus. When the apparatus such as the personal computer is in desk-top use, the AC adapter remains connected at all times. In this case, the charging is mainly directed to replenishment of the self-discharge of the internal battery. On the other hand, the hand-held use often causes the battery-based apparatus operation. For this reason, charging of the internal battery is performed when the AC adapter is mounted on the apparatus or when the internal battery is loaded in the apparatus with the AD adapter being connected to the apparatus. In this manner, the mode of operation of the apparatus can be recognized in a corresponding manner to the trigger phenomenon to start the charge of the internal battery. Thus, the present invention provides a hand-held information processing apparatus, a charging apparatus and a charging method which realize both the prevention of degradation of the battery in the desk-top use with the AC adapter being connected at all times and the securement of the battery charging capacity in the hand-held use.

According to first and second aspects of the present invention there are provided a hand-held information processing apparatus and a charging apparatus which, when an external power source is unconnected for example, supply an electric power from an internal battery to a load and which, upon connection with the external power source, supplies an electric power from the external power source to the load and charges the internal battery, the apparatuses each comprising a charging circuit capable of charging the battery by setting different charging voltages; and a charging control unit which variably sets the charging voltage of the internal battery in response to trigger phenomenon to start charging of the internal battery. Thus, in the present invention, the charging voltage is raised to effect the charging as much as possible in the charge upon the detection of connection with the AC adapter and upon the detection of loading of the battery, whereas the charging voltage is lowered in the charge for supplementing the reduction attributable to the self-discharge, to thereby suppress the occurrence of the charge/discharge cycle arising from the self-discharge of the lithium ion battery to consequently prevent the degradation of the battery and elongate the service life thereof.

In this event, correspondingly to the trigger phenomenon to start charging of the internal battery, the charging control unit sets either a first charging voltage at which the charging capacity of the internal battery is maximized or a second charging voltage which is lower than the first charging voltage. When starting charging of the internal battery as a result of connection with the external power source, the charging control unit sets the first charging voltage for charging at which the charging capacity of the internal battery is maximized, and wherein when starting charging as a result of recognition of a reduction in the capacity of the internal battery due to its self-discharge, the charging control unit sets the second charging voltage which is lower than the first charging voltage. With the external power source connected, when starting charging of the battery as a result of mounting of the internal battery on the apparatus, the charging control unit sets the first charging voltage at which the charging capacity of the internal voltage is maximized, and wherein with the external power source connected, when starting charging as a result of recognition of a reduction in the capacity of the internal battery due to its self-discharge, the charging control unit sets the second charging voltage which is lower than the first charging voltage. The apparatuses may each further comprise a setting change unit which changes set voltages as charging voltages to be set for the charging circuit to any voltages, the set voltages being defined for each trigger phenomena to start charging of the internal battery. As to the lithium ion battery, the setting change unit sets for the charging circuit the first charging voltage of 4.2V per cell and the second charging voltage of 4.1V per cell for example. The apparatuses may each further comprise a switching operation unit by means of which, for the charging circuit, the user switches the charging voltage to either the first charging voltage or the second charging voltage. This enables the selection of the charging voltage to be made by the judgment of the user. For instance, upon the hand-held use with the AC adapter removed, the user may change the setting of the charging voltage to a higher voltage previous to the removal of the AC adapter, whereby the user can shift to the hand-held use after maximizing the charge.

According to a third aspect of the present invention there is provided a method of charging equipment which, when an external power source is unconnected, supplies an electric power from an internal battery to a load and which, upon connection with the external power source, supplies an electric power from the external power source to the load and charges the internal battery, the method comprising the step of changing the charging voltage of said internal battery in response to trigger phenomenon to start charging of the internal battery, to charge said internal battery. More specifically, the method may further comprise the step of, in response to trigger phenomenon to start the charging of the internal battery, setting either a first charging voltage at which the charging capacity of the internal battery is maximized or a second charging voltage which is lower than the first charging voltage, to charge the internal battery. The details of this charging method are substantially the same as the case of the apparatus configuration.

The above and other objects, aspects, features and advantages of the present invention will become more apparent from the following detailed description with reference to the accompanying drawings.

BRIEF DESCRIPTION OF THE DRAWINGS

FIGS. 5A to 5C are time charts of the charging control of FIG. 2; and

DETAILED DESCRIPTION OF THE PREFERRED EMBODIMENT

Figure 1:
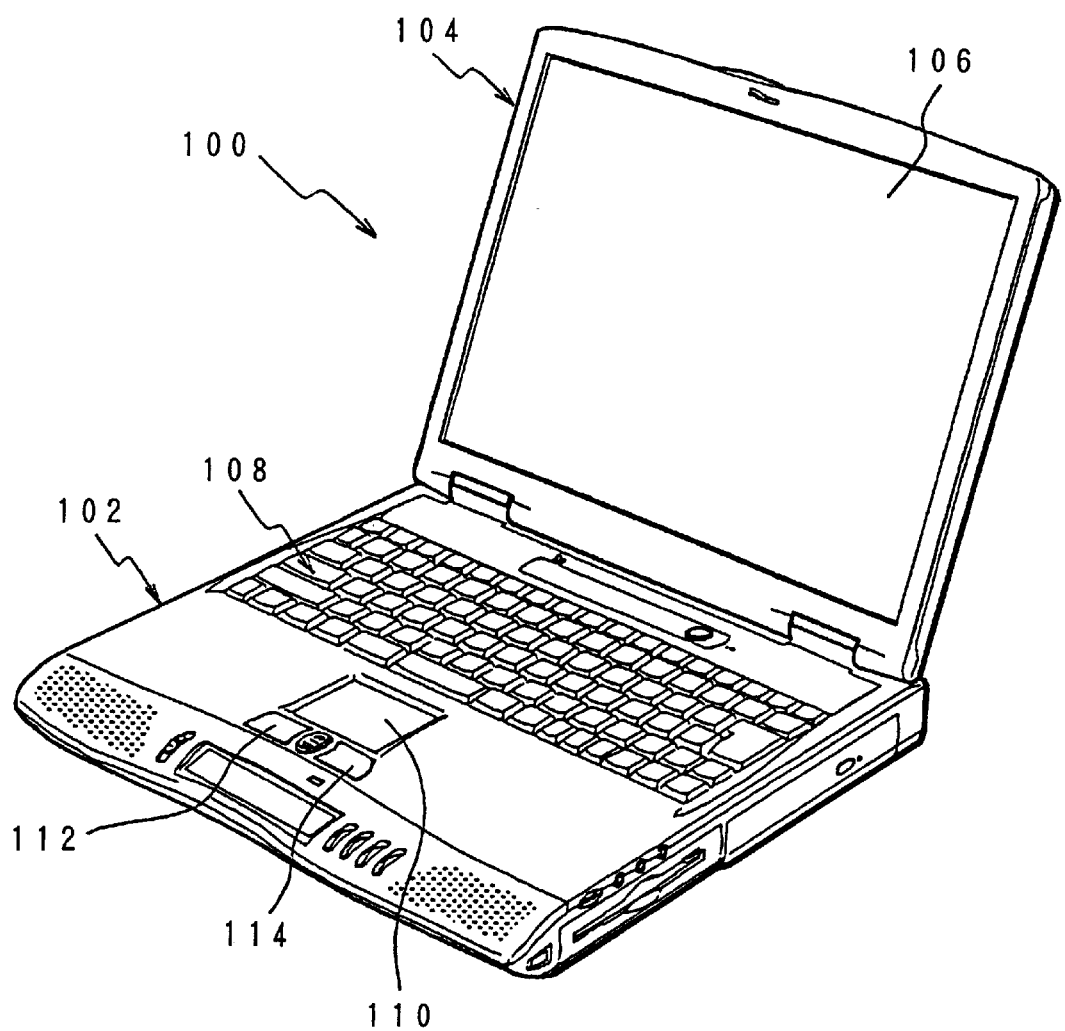
FIG. 1 is an explanatory diagram of a notebook-sized personal computer employing the present invention.

FIG. 1 depicts a notebook-sized personal computer acting as a hand-held information processor provided with a charging apparatus in accordance with the present invention. The notebook-sized personal computer is designated generally at 100 and comprises a body 102 and a cover 104 which has on its inner side a liquid crystal color display 106. The body 102 includes a keyboard 108, a flat point 110 which is positioned closer to the operator than the keyboard 108, the flat point 110 being used to operate a mouse pointer on the liquid crystal display 106, and a left click button 112 and a right click button 114 which are positioned closer to the operator than the flat point 110, the right 112 and left 114 click buttons corresponding to left and right buttons of the mouse, respectively.

Figure 2:
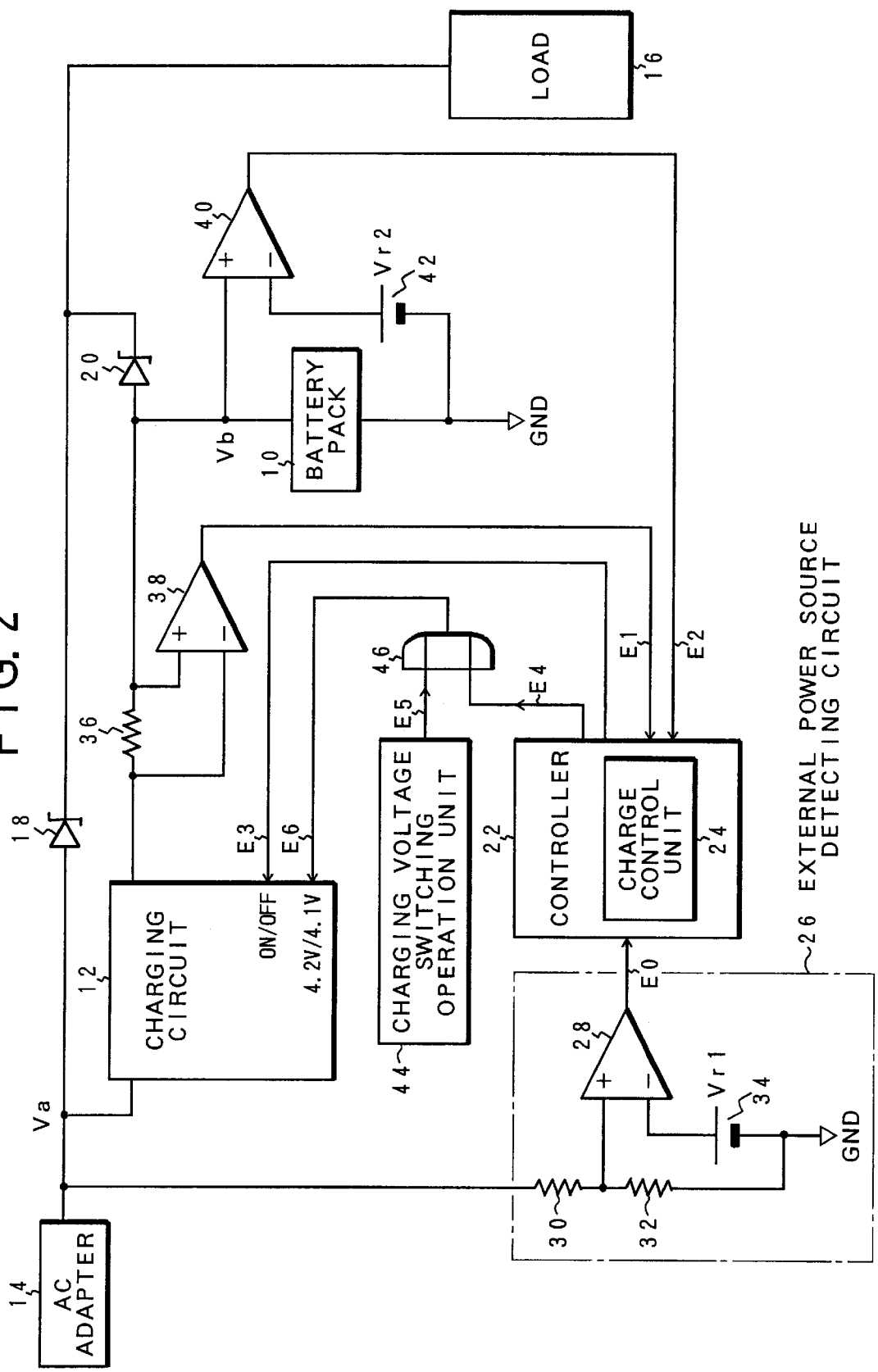
FIG. 2 is a circuit block diagram of an embodiment of the present invention incorporated in the notebook-sized personal computer of FIG. 1.

FIG. 2 is a block diagram of the charging apparatus incorporated in the notebook-sized personal computer. The notebook-sized personal computer serving as the hand-held information processor comprises a battery pack 10 using a lithium ion battery cell as an internal battery, with a charging circuit 12 associated with the battery pack 10. A supply of external power is effected by a connection of an AC adapter 14. When a plug of the AC adapter 14 is connected to an AC power source, a predetermined DC voltage Va is output from the AC adapter 14. A power supply line from the AC adapter 14 is connected via a diode 18 to a load 16 of hand-held equipment. An output line from the AC adapter 14 branches to the charging circuit 12, with output from the charging circuit 12 being connected via a current sense resistor 36 to the positive side of the battery pack 10 and further via a diode 20 to the load 16 through the power supply line from the AC adapter 14. The battery pack 10 incorporates e.g., one cell of the lithium ion battery which supplies a nominal battery voltage Vb of 3.6V per cell to the load. The charging voltage maximized by the capacity at the full charge per cell of the lithium ion battery is set to e.g., 4.2V. Although the battery pack 10 incorporates one cell of the lithium battery having a nominal battery voltage of 3.6V and a charging voltage of 4.2V by way of example, the number of cells used may be increased if necessary. In such a case, the nominal battery voltage and the charging voltage increase in proportion to the number of cells. In case of two cells for example, the nominal battery voltage and the charging battery voltage result in 7.2V and 8.4V, respectively. In case of three cells, the nominal battery voltage and the charging battery voltage result in 10.8V and 12.6V, respectively. When the battery pack 10 is in full charge, the output voltage Va from the AC adapter 14 is higher than the battery voltage Vb. For this reason, in cases where an external power is supplied as a result of connection of the AC adapter 14, the diode 18 conducts under forward bias so that electric power is supplied from the AC adapter 14 to the load 16. On the contrary, for the battery pack 10, the diode 20 remains off under reverse bias by the adapter output voltage Va higher than the battery voltage Vb, so that the battery pack 10 is by no means charged by the output voltage Va of the AC adapter 14. The charging circuit 12 is under charging control for the battery pack 10 by a charging control unit 24 included in a controller 22. The controller 22 can be a one-chip MPU for example and the function of the charging control unit 24 is implemented by its control program thereof. The controller 22 is associated with an external power source detection circuit 26. The external power source detection circuit 26 includes a comparator 28, resistors 30 and 32, and a reference voltage source 34. The output voltage Va of the AC adapter 14 is voltage-divided by the resistors 30 and 32 for impartment to the positive input terminal. The comparator 28 compares it with a reference voltage Vr1 at the negative input terminal 34. If the output voltage Va is higher than the reference voltage Vr1, then the comparator 28 generates a high output so that the charging control unit 24 of the controller 22 can recognize the state of connection of the AC adapter 14. The charging control unit 24 of the controller 22 allows a comparator 40 to compare the battery voltage Vb of the battery pack 10 with a reference voltage Vr2 of a reference voltage source 42 and outputs a charge-on signal E3 to the charging circuit 12 in response to a low output from the comparator 40 when the battery voltage Vr2 becomes less than the reference voltage Vr2, to thereby start the charging. A constant-voltage constant-current charging is effected for the charge of the battery pack 10 by the charging circuit 12. During this constant-voltage constant-current charging, a comparator 38 detects a voltage proportional to the charging current through the current sense resistor 36 inserted in the output line from the charging circuit 12 and feeds a current sense signal E1 to the controller 22. When the charging current by the current sense signal E1 becomes not more than a predetermined current, e.g., 50 mA, the controller 12 judges that the charging of the battery pack 10 has reached 100% and halts the charge-on signal E3 to turn off the charging operation of the charging circuit 12. Furthermore, in the present invention, when starting the charging in response to the detection of mounting of the AC adapter 14 by the external power source detection circuit 26 where the external power is supplied by the connection of the AC adapter 14, the charging control unit 24 included in the controller 22 judges the hand-held use and sets for the charging circuit 12 a first charging voltage Vc1 whose maximum conforms to the charging capacity of the battery pack 10, based on a charging voltage set signal E4, for charging. 4.2V/cell is defined as the first charging voltage Vc1 whose maximum conforms to the capacity in charge use. In the event that the external power source is in connection by way of the AC adapter 14, the charging control unit 24 when the charging of the battery is started as a result of mounting of the battery pack 10 judges the hand-held use similar to the detection of mounting of the AC adapter and sets the first charging voltage Vc1=4.2V/cell where the charging capacity of the internal battery becomes as large as possible, to effect the charging. In contrast with this, when starting the charging as a result of recognition of a decreased capacity attributable to the self-discharge of the battery pack 10 in the constantly-connected state of the AC adapter 14, the charging control unit 24 judges the desk-top use and switchingly sets the second charging voltage Vc2=4.1V/cell lower than the first charging voltage Vc1=4.2V/cell in response to a charging voltage set signal E4, to thereby effect the charging by a lower charging voltage than the charging upon the detection of mounting of the AC adapter or upon the detection of mounting of the battery pack. This second charging voltage Vc2=4.1V/cell is a voltage lower 0.1V/cell than the first charging voltage Vc1=4.2V/cell and serves to prevent degradation of the battery pack 10 and elongate its service life under the high-temperature environment by lowering the charging voltage. The start of charging by the charging control unit 24 of the controller 22 is effected in response to a voltage sense signal E2 from the comparator 40. The comparator 40 compares the voltage of the battery pack 10 with the reference voltage Vr2, e.g., Vr2=2.8 volts so that the charging is started by a low output from the comparator 40 when the battery voltage Vb lowers to the reference voltage Vr2 or below as a result of the discharge of the battery pack 10. The embodiment of FIG. 2 is further provided with a charging voltage switching operation unit 44 for externally compulsorily switching the charging voltage of the charging circuit 12 in response to a setting operation by the user.

Through operation of, e.g., a switching button disposed on the hand-held apparatus, the charging voltage switching operation unit 44 provides as its output a charging voltage switching signal E5 which in turn is imparted as a charging voltage switching signal E6 via an OR circuit 46 to the charging circuit 12, whereby in this embodiment switching setting can be effected of either the first charging voltage Vc1=4.2V/cell or the second charging voltage Vc2=4.1V/cell. In the event that the user initially makes desk-top use with the AC adapter 14 connected at all times and thereafter shifts to the hand-held use for some reasons, the user acts on the charging voltage switching operation unit 44 to compulsorily switch the charging voltage of the charging circuit 12 to the higher first charging voltage Vc1=4.2V/cell to thereby charge the battery pack 10 so that the charging capacity thereof becomes as high a level as possible. In addition to the operation of the switching button disposed on the hand-held equipment, the switching by the charging voltage switching operation unit 44 may be effected through an instruction of the load 16 side to the software in the controller 22, more specifically, through a software instruction by, e.g., a mouse click using the window on the screen.

Figure 3:
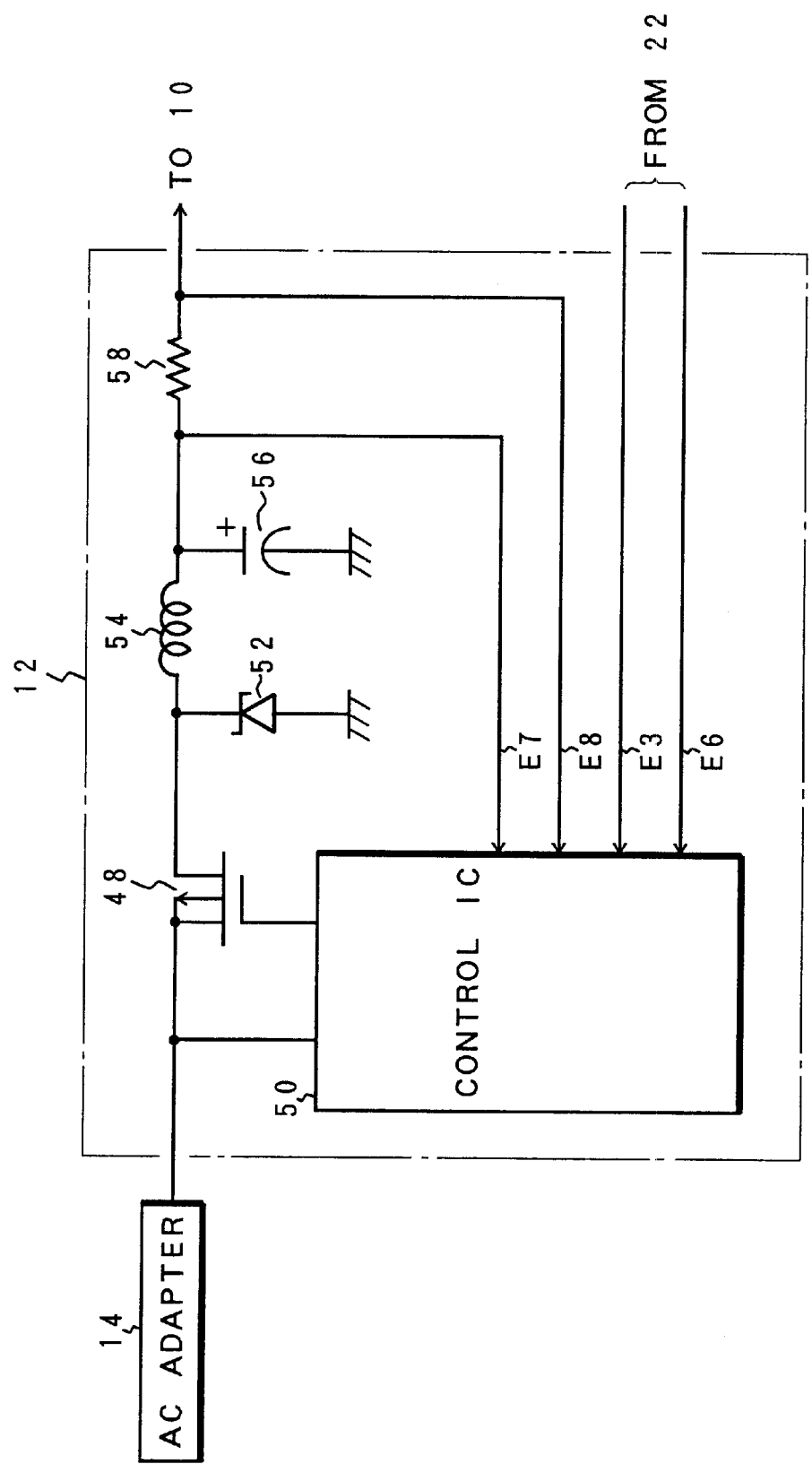
FIG. 3 is a circuit block diagram of a charging circuit of FIG. 2.

FIG. 3 depicts an embodiment of the charging circuit 12 of FIG. 2. The charging circuit 12 is provided with a switching regulator which comprises an FET 48 acting as a switching element, a control IC 50, a rectifying Zener diode 52, an inductance 54 and a smoothing capacitor 56. The switching regulator included in the charging circuit 12 provides a step-down chopper. The control IC 50 receives the charge-on signal E3 and the charging voltage setting signal E6 from the controller 22 of FIG. 2. The control IC 50 further receives a voltage sense signal E7 and an output voltage sense signal E8 through signal lines extending from opposed ends of a current sense resistor 58 inserted in the output line of the switching regulator.

Figure 4:
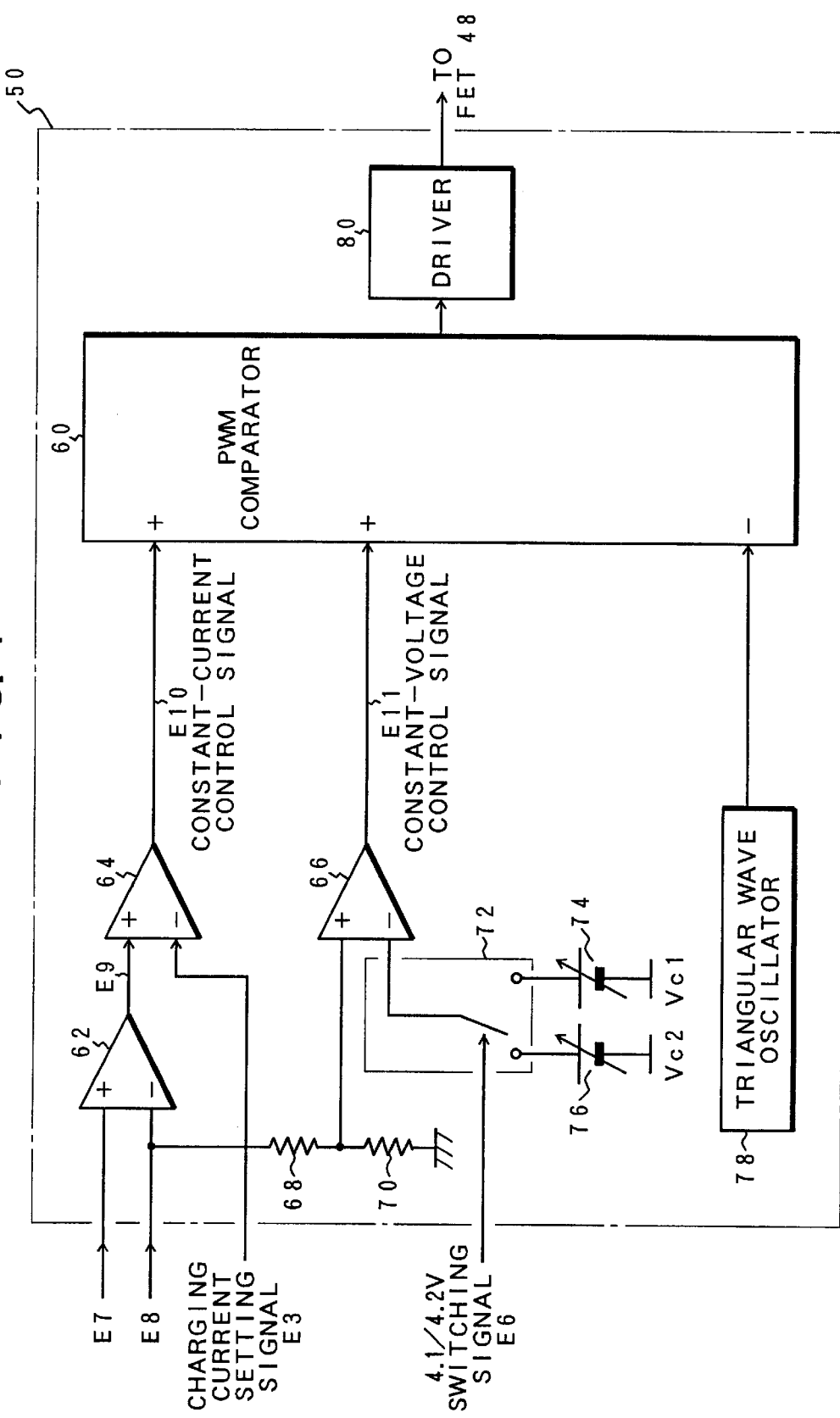
FIG. 4 is a circuit block diagram of a control IC of FIG. 3.

The control IC 50 has a circuit configuration of FIG. 4. The control IC 50 comprises a PWM comparator 60. The PWM comparator 60 is associated with operational amplifiers 62 and 64 for constant-current control. The operational amplifier 62 receives at its positive side the current sense signal E7 from the positive side of the current sense resistor 58 of FIG. 3 and receives at its negative side the output voltage sense signal E8 from the output line. The operational amplifier 62 outputs a current sense signal E9 as a difference between the two signals E7 and E8. The current sense signal E9 from the operational amplifier 62 is fed to a negative input of the operational amplifier 64 whose positive input receives the charge-on signal E3 from the controller 22 of FIG. 2. This charge-on signal E3 serves actually as a charging current setting signal for setting a target output current for the comparator 60. For this reason, the operational amplifier 64 outputs to the PWM comparator 60 a constant-current control signal E10 which depends on an error between the current sense signal E9 output from the operational amplifier 62 and the charging current setting signal E3 from the controller 22. The PWM comparator 60 compares a triangular wave signal from a triangular wave oscillator 78 with the reference voltage to output a pulsed signal having a pulse width which depends on the reference voltage level, so that the reference voltage level is varied by the constant-current control signal E10 from the operational amplifier 64. For this reason, via a driver 80 the PWM comparator 60 provides a constant-current control by which the switching cycle of the FET 48 is controlled so as to allow the charging current to conform to the charging set current. The PWM comparator 60 is further associated with an operational amplifier 66 for constant-voltage control. A negative input of the operational amplifier 66 receives the output voltage sense signal E8 which has been voltage divided by resistors 68 and 70. A positive input of the operational amplifier 66 is connected to a reference voltage source 74 or 76 which is selected by a switching circuit 72. In this case, the reference voltage source 74 generates the first charging voltage Vc1=4.2V/cell and the reference voltage source 76 generates the second charging voltage Vc2=4.1V/cell, which are switched by the switching circuit 62 that receives the charging voltage switching signal E6 from the controller 22 of FIG. 2. The reference voltage sources 74 and 76 act as variable voltage sources and provide a setting change unit allowing a change of setting of the charging voltage. The comparator 66 outputs to the PWM comparator 60 a constant-voltage control signal E11 in conformity with on an error between either the first charging voltage Vc1 or the second charging voltage Vc2 switched by the switching circuit 72 and the output voltage sense signal which has been voltage divided by the resistors 68 and 70. The comparator 66 then varies the reference voltage level for the triangular wave signal depending on the constant-voltage control signal E11. Via the driver 80, the comparator 66 thus controls the on-time in the switching control of the FET 48 of FIG. 3 so as to keep the output voltage unvarying.

FIGS. 5A to 5C are time charts of the charging control effected upon the connection of the AC adapter 14 in the embodiment of FIG. 2. The AC adapter 14 is unconnected till the time t1. For this reason, an AC adapter detection signal E0 of FIG. 5A is low, allowing the battery pack 10 to supply a power to the load 16. This discharge lowers the battery voltage Vb of FIG. 5C with the lapse of time. Assume that the AC adapter 14 is connected to perform the supply of external power at the time t1 after the battery voltage Vb has dropped below a charging start voltage Vs which is determined by the reference voltage Vr of the reference voltage source 42 of the comparator 40 as a result of supply of power from the battery pack 10 to the load 16. The output voltage Va by the connection of the AC adapter 14 at the time t1 allows the AC adapter detection signal E0 which is an output of the comparator 28 of the external power source detection circuit 26 to go high so that the charging control unit 24 of the controller 22 can recognize the connection of the AC adapter 14. Since the battery voltage Vb at that time has already dropped below the reference voltage Vr2 corresponding to the charge start signal Vs with a low voltage sense signal E2 from the comparator 40, the charging control unit 24 recognizes the charging based on the detection of mounting of the AC adapter 14 and instructs the charging circuit 12 to set the first charging voltage Vc1=4.2V/cell by use of the charging voltage setting signal E4. The charging control unit 24 further provides a charging on/off signal E3 of FIG. 5B as its output to the charging circuit 12 to thereby start the charging. Thus, from the time t1, the charging circuit 12 starts the constant-current constant-voltage charge for the battery pack 10 with the result that the battery voltage Vb increases toward the charging voltage Vc1=4.2V/cell. Then, when the charging control unit 24 detects that the charging current has decreased to a predetermined current, e.g., 50 mA from the current sense signal E1 based on the detection voltage at the current sense resistor 36, the charging control unit 24 judges completion of 100% charge to halt the charging of the charging circuit 12 at the time t2. The AC adapter 14 is in connection after the time t2 and hence the load 16 accepts the supply of power from the AC adapter 14, whereupon the supply of power from the battery pack 10 to the load is not effected and the battery pack 10 has a gradually lowering battery voltage Vb attributable to the self-discharge. When the battery voltage Vb has dropped below the charging start voltage Vs at the time t3 as a result of lowering of the battery voltage Vb by the self-discharge, the voltage sense signal E2 from the comparator 40 goes low, allowing the charging control unit 24 of the controller 22 to effect the charging by the charging circuit 12. Since the charging is not based on the detection of mounting of the AC adapter 14 in this case, the charging control unit 24 recognizes that the capacity has decreased by its self-discharge and sets for the charging circuit 14 the second charging voltage Vc2 of 4.1V/cell lower than the first cycle in response to the charging voltage setting signal E4, to start the constant-current constant-voltage charging. The charging is terminated at the time t4 when the charging current has decreased to a normal current. After the time t4, as long as the AC adapter 14 is in connection by its desk-top use, the charging by the setting of the second charging voltage Vc2=4.1V/cell is iterated for the reduction of the capacity attributable to the self-discharge. In this manner, with respect to the charging for the reduction of the capacity by the self-discharge, the charging by the setting of the lower charging voltage is iterated to suppress the degradation of the battery. On the other hand, in its hand-held use, the charging by the detection of mounting of the AC adapter 14 is frequency iterated. Thus, in this hand-held use, the setting of the first charging voltage Vc1=4.2V/cell enables the charging to be made so that the capacity of the battery pack 10 is maximized.

Figure 6A:
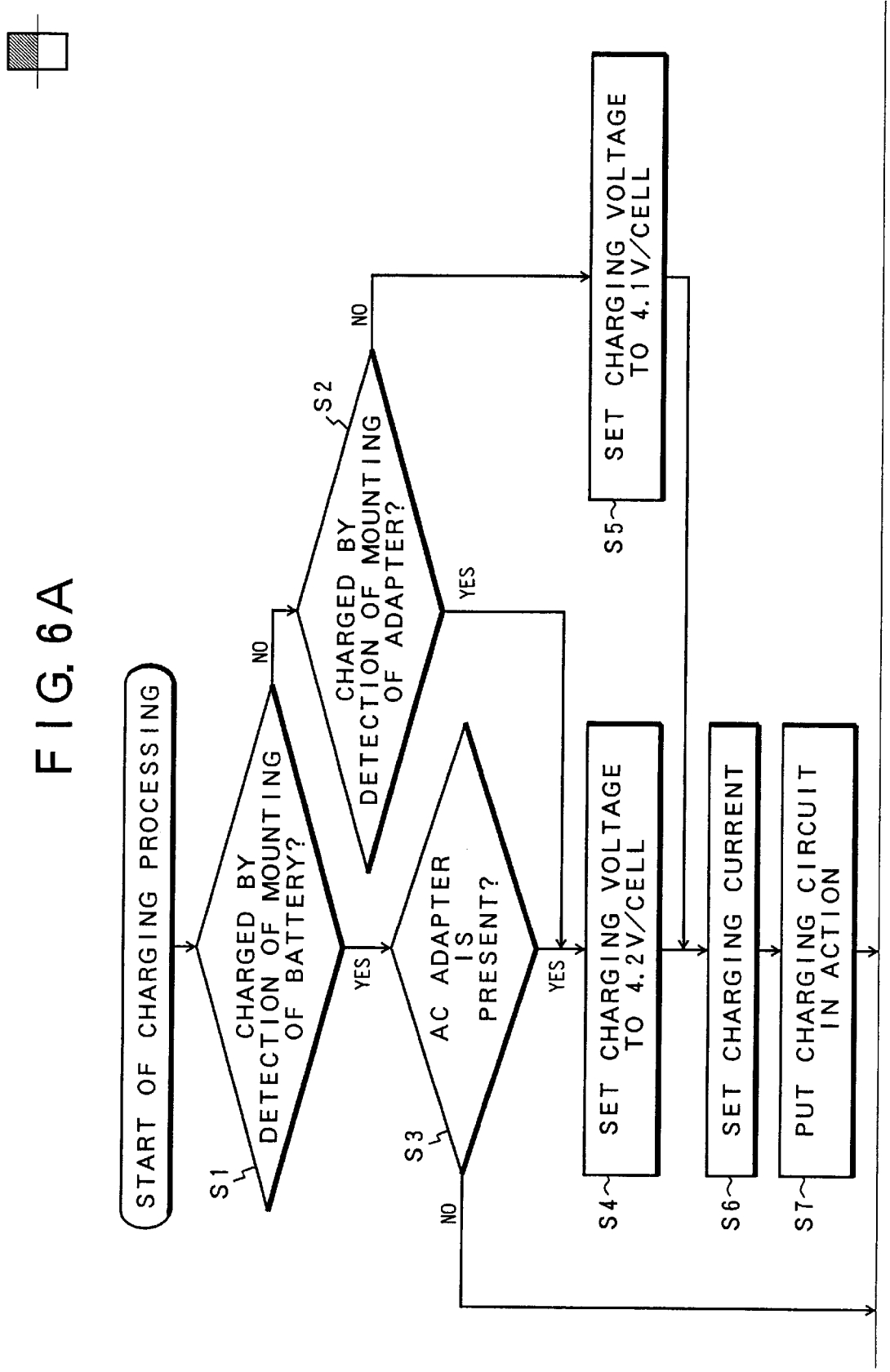
FIGS. 6A and 6B are flowcharts of the charging control of FIG. 2.
Figure 6B:
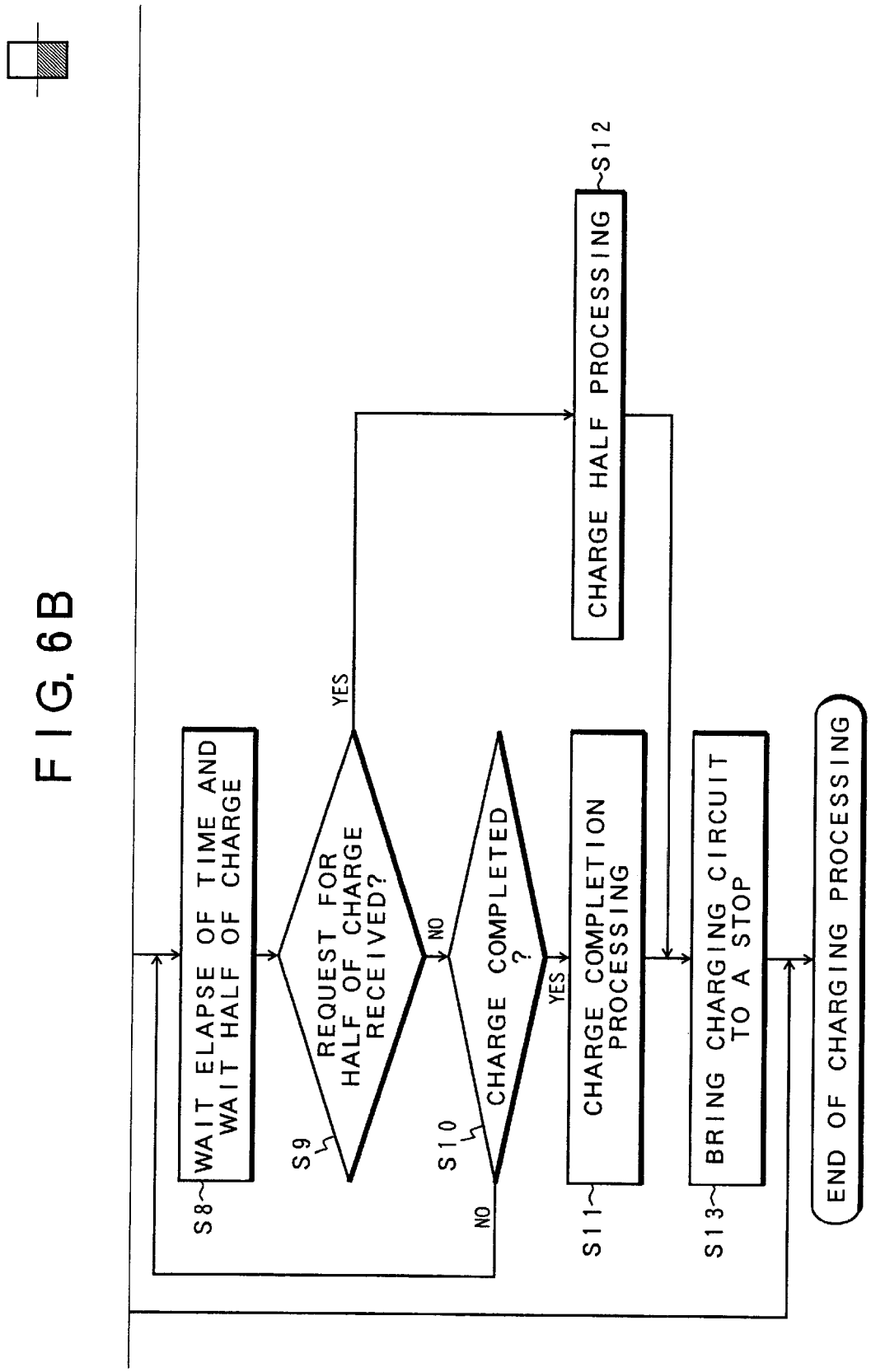

FIGS. 6A and 6B are flowcharts of the charging control effected by the charging control unit 24 included in the controller 22 of FIG. 2. The charging control unit 24 makes a check in step S1 to see if the charging is to be made or not by the detection of mounting of the battery pack 10. If the battery pack 10 has already been mounted, then the procedure goes to step S2 where it is checked whether the charging is to be made or not by the detection of the AC adapter. If the charging by the detection of mounting of the AC adapter is judged in step S2, then it is judged that the apparatus such as the notebook-sized personal computer is in hand-held use, allowing the procedure to go to step S4 where the charging voltage is set to the first charging voltage Vc1=4.2/cell. If the detection of mounting of the battery cell 10 is discriminated in step S1, then it is discriminated that the apparatus is in connected state by the AC adapter 14 in step S3 to judge the hand-held use. Similarly, the procedure goes to step S4 where the first charging voltage Vc1=4.2V/cell is set as the charging voltage. On the contrary, if the charging by the detection of mounting of the AC adapter is not discriminated in step S2, then it is judged that the charging has been effected due to the reduction of capacity by the self-discharge of the battery pack 10 in desk-top use, allowing the procedure to go to step S5 to set the second charging voltage Vc2=4.1V/cell. After the completion of the setting of the charging voltage in step S4 or step S5, the charging current is set in step S6 and the charging circuit 12 is operated in step S7 to effect the constant-current constant-voltage charging. Then, in step S8 the elapse of time and the halt of charge is waited, and in step S9 a check is made of the request to halt the charge. The completion of charge is checked in step S10, and if affirmative, then the procedure goes to step S11 to perform the charge completion processing, after which the charging circuit 12 is stopped in step S13. If a charge halt request occurs during the charge, then the procedure goes from step S9 to step S12 to per form the charge halt processing, after which the charging circuit 12 is stopped in step S13.

According to the present invention, as set forth hereinabove, the charging voltage is raised to maximize the charging capacity when starting the charge of battery as a result of judgment of the hand-held use of the apparatus from the detection of mounting of the AC adapter or from the detection of mounting of the internal battery with the AC adapter connected, whereas the charging voltage is lowered when starting the charging as a result of recognition of reduced capacity attributable to the self-discharge of the internal battery, whereby it is possible to prevent the degradation of the battery in the high-temperature environment and to elongate the service life.

Although the above embodiment has been directed to the lithium ion battery by way of example, the present invention is not limited thereto and is applicable intactly to, e.g., a lithium polymer battery or any other battery for use as the secondary battery for the hand-held equipment, as long as it is employed as measures against the degradation attributable to the discharge by the internal impedance of the battery with the AC adapter connected. In this case, specific values of the first charging voltage Vc1 and of the second charging voltage Vc2 can be ones suited for the performances of the respective batteries. The present invention is intended to include any variants without impairing the objects and advantages thereof and is by no means restricted by numerical values indicated in the above embodiment.

What is claimed is:

1. A hand-held information processing apparatus which, when an external power source is unconnected, supplies an electric power from an internal battery to a load and which, upon connection with said external power source, supplies an electric power from said external power source to said load and charges said internal battery, said apparatus comprising:

a charging circuit capable of charging said battery by switchably setting a charging voltage to a high or low charging voltage; and a charging control unit connected to the charging circuit which variably sets the charging voltage of said internal battery in response to a trigger phenomenon to start charging of said internal battery, wherein the charging voltage is set to the low charging voltage except when the trigger phenomenon is the internal battery being installed and connection is made with the external power source via an AC adapter, or when the AC adapter is connected to the external power source and the internal battery.

2. The apparatus according to claim 1, wherein in response to said trigger phenomenon to start charging of said internal battery, said charging control unit sets either a first charging voltage at which the charging capacity of said internal battery is maximized or a second charging voltage which is lower than said first charging voltage.

3. A hand-held information processing apparatus which, when an external power source is unconnected, supplies an electric power from an internal battery to a load and which, upon connection with said external power source, supplies an electric power from said external power source to said load and charges said internal battery, said apparatus comprising:

a charging circuit capable of charging said battery by switchably setting a charging voltage to a high or low charging voltage; and a charging control unit connected to the charging circuit which variably sets the charging voltage of said internal battery in response to a trigger phenomenon to start charging of said internal battery, wherein the charging voltage is set to the low charging voltage except when the trigger phenomenon is the internal battery being installed and connection is made with the external power source via an AC adapter, or when the AC adapter is connected to the external power source and the internal battery, wherein when starting charging of said internal battery as a result of connection with said external power source, said charging control unit sets said first charging voltage for charging at which the charging capacity of said internal battery is maximized, and wherein when starting charging as a result of recognition of a reduction in the capacity of said internal battery due to its self-discharge, said charging control unit sets said second charging voltage which is lower than said first charging voltage.

4. A hand-held information processing apparatus which, when an external power source is unconnected, supplies an electric power from an internal battery to a load and which, upon connection with said external power source, supplies an electric power from said external power source to said load and charges said internal battery, said apparatus comprising:

a charging circuit capable of charging said battery by switchably setting a charging voltage to a high or low charging voltage; and a charging control unit connected to the charging circuit which variably sets the charging voltage of said internal battery in response to a trigger phenomenon to start charging of said internal battery, wherein the charging voltage is set to the low charging voltage except when the trigger phenomenon is the internal battery being installed and connection is made with the external power source via an AC adapter, or when the AC adapter is connected to the external power source and the internal battery;

wherein with said external power source connected, when starting charging of said battery as a result of mounting of said internal battery on said apparatus, said charging control unit sets said first charging voltage at which the charging capacity of said internal voltage is maximized, and wherein with said external power source connected, when starting charging as a result of recognition of a reduction in the capacity of said internal battery due to its self-discharge, said charging control unit sets said second charging voltage which is lower than said first charging voltage.

5. A hand-held information Processing apparatus which, when an external power source is unconnected, supplies an electric power from an internal battery to a load and which, upon connection with said external power source, supplies an electric power from said external power source to said load and charges said internal battery, said apparatus comprising:

a charging circuit capable of charging said battery by switchably setting a charging voltage to a high or low charging voltage;

a charging control unit connected to the charging circuit which variably sets the charging voltage of said internal battery in response to a trigger phenomenon to start charging of said internal battery, wherein the charging voltage is set to the low charging voltage except when the trigger phenomenon is the internal battery being installed and connection is made with the external power source via an AC adapter, or when the AC adapter is connected to the external power source and the internal battery; and a setting change unit which changes set voltages as charging voltages to be set for said charging circuit to any voltages, said set voltages being defined for each trigger phenomena to start charging of said internal battery.

6. A hand-held information Processing apparatus which, when an external power source is unconnected, supplies an electric power from an internal battery to a load and which, upon connection with said external power source, supplies an electric power from said external power source to said load and charges said internal battery, said apparatus comprising:

a charging circuit capable of charging said battery by switchably setting a charging voltage to a high or low charging voltage;

a charging control unit connected to the charging circuit which variably sets the charging voltage of said internal battery in response to a trigger phenomenon to start charging of said internal battery, wherein the charging voltage is set to the low charging voltage except when the trigger phenomenon is the internal battery being installed and connection is made with the external power source via an AC adapter, or when the AC adapter is connected to the external power source and the internal battery; and a switching operation unit which, for said charging circuit, switches said charging voltage to either said first charging voltage or said second charging voltage.

7. A charging apparatus for equipment which, when an external power source is unconnected, supplies an electric power from an internal battery to a load and which, upon connection with said external power source, supplies an electric power from said external power source to said load and charges said internal battery, said apparatus comprising:

a charging circuit capable of charging said battery by setting different charging voltages; and a charging control unit which variably sets the charging voltage of said internal battery in response to trigger phenomenon to start charging of said internal battery.

8. The apparatus according to claim 7, wherein in response to said trigger phenomenon to start charging of said internal battery, said charging control unit sets either a first charging voltage at which the charging capacity of said internal battery is maximized or a second charging voltage which is lower than said first charging voltage.

9. The charging apparatus recited in claim 7, wherein the high charging voltage is set to 4.2 V/cell and the low charging voltage is set to 4.1 V/cell.

10. A charging apparatus for equipment which, when an external power source is unconnected, supplies an electric power from an internal battery to a load and which, upon connection with said external power source, supplies an electric power from said external power source to said load and charges said internal battery, said apparatus comprising:

a charging circuit capable of charging said battery by setting different charging voltages; and a charging control unit which variably sets the charging voltage of said internal battery in response to trigger phenomenon to start charging of said internal battery, wherein with said external power source connected, when starting charging of said battery as a result of mounting of said internal battery on said apparatus, said charging control unit sets said first charging voltage at which the charging capacity of said internal voltage is maximized, and wherein with said external power source connected, when starting charging as a result of recognition of a reduction in the capacity of said internal battery due to its self-discharge, said charging control unit sets said second charging voltage which is lower than said first charging voltage.

11. A charging apparatus for equipment which, when an external power source is unconnected, supplies an electric power from an internal battery to a load and which, upon connection with said external power source, supplies an electric power from said external power source to said load and charges said internal battery, said apparatus comprising:

a charging circuit capable of charging said battery by setting different charging voltages;

a charging control unit which variably sets the charging voltage of said internal battery in response to trigger phenomenon to start charging of said internal battery; and a setting change unit which changes set voltages as charging voltages to be set for said charging circuit to any voltages, said set voltages being defined for each trigger phenomena to start charging of said internal battery.

12. A charging apparatus for equipment which, when an external power source is unconnected, supplies an electric power from an internal battery to a load and which, upon connection with said external power source, supplies an electric power from said external power source to said load and charges said internal battery, said apparatus comprising:

a charging circuit capable of charging said battery by setting different charging voltages;

a charging control unit which variably sets the charging voltage of said internal battery in response to trigger phenomenon to start charging of said internal battery; and a switching operation unit which, for said charging circuit, switches said charging voltage to either said first charging voltage or said second charging voltage.

13. A charging apparatus for equipment which, when an external power source is unconnected, supplies an electric power from an internal battery to a load and which, upon connection with said external power source, supplies an electric power from said external power source to said load and charges said internal battery, said apparatus comprising:

a charging circuit capable of charging said battery by setting different charging voltages; and a charging control unit which variably sets the charging voltage of said internal battery in response to trigger phenomenon to start charging of said internal battery;

wherein when starting charging of said internal battery as a result of connection with said external power source, said charging control unit sets said first charging voltage for charging at which the charging capacity of said internal battery is maximized, and wherein when starting charging as a result of recognition of a reduction in the capacity of said internal battery due to its self-discharge, said charging control unit sets said second charging voltage which is lower than said first charging voltage.

14. A method of charging equipment which, when an external power source is unconnected, supplies an electric power from an internal battery to a load and which, upon connection with said external power source, supplies an electric power from said external power source to said load and charges said internal battery, said method comprising the step of:

in response to the trigger phenomenon to start the charging of said internal battery, changing the charging voltage of said internal battery to charge said internal battery.

15. The method according to claim 14, further comprising the step of: in response to the trigger phenomenon to start the charging of said internal battery, setting either a first charging voltage at which the charging capacity of said internal battery is maximized or a second charging voltage which is lower than said first charging voltage, to charge said internal battery.

16. The method recited in claim 14, wherein the high charging voltage is set to 4.2 V/cell and the low charging voltage is set to 4.1 V/cell.

17. A method of charging equipment which, when an external power source is unconnected, supplies an electric power from an internal battery to a load and which, upon connection with said external power source, supplies an electric power from said external power source to said load and charges said internal battery, said method comprising the step of:

in response to the trigger phenomenon to start the charging of said internal battery, changing the charging voltage of said internal battery to charge said internal battery; and changing a set voltage to any voltage, said set voltage being defined for each trigger phenomena to start charging of said internal battery.

18. A method of charging equipment which, when an external power source is unconnected, supplies an electric power from an internal battery to a load and which, upon connection with said external power source, supplies an electric power from said external power source to said load and charges said internal battery, said method comprising the step of:

in response to the trigger phenomenon to start the charging of said internal battery, changing the charging voltage of said internal battery to charge said internal battery; and switching said charging voltage to either said first charging voltage or said second charging voltage by external operation.

19. A hand-held information processing apparatus which, when an external power source is unconnected, supplies an electric power from an internal battery to a load and which, upon connection with said external power source, supplies an electric power from said external power source to said load and charges said internal battery, said apparatus comprising:

a charging circuit capable of charging said battery by switchably setting a charging voltage to a high or low charging voltage; and a charging control unit connected to the charging circuit which variably sets the charging voltage of said internal battery in response to a trigger phenomenon to start charging of said internal battery, wherein the charging voltage is set to the low charging voltage except when the trigger phenomenon is the internal battery being installed and connection is made with the external power source via an AC adapter, or when the AC adapter is connected to the external power source and the internal battery, wherein the high charging voltage is set to 4.2 V/cell and the low charging voltage is set to 4.1 V/cell.

20. A method of charging equipment which, when an external power source is unconnected, supplies an electric power from an internal battery to a load and which, upon connection with said external power source, supplies an electric power from said external power source to said load and charges said internal battery, said method comprising the step of:

in response to the trigger phenomenon to start the charging of said internal battery, changing the charging voltage of said internal battery to charge said internal battery; and when starting charging of said internal battery as a result of connection with said external power source, setting said first charging voltage for charging at which the charging capacity of said internal battery is maximized, and when starting charging as a result of recognition of a reduction in the capacity of said internal battery due to its self-discharge, setting said second charging voltage for charging which is lower than said first charging voltage.

21. A method of charging equipment which, when an external power source is unconnected, supplies an electric power from an internal battery to a load and which, upon connection with said external power source, supplies an electric power from said external power source to said load and charges said internal battery, said method comprising the step of:

in response to the trigger phenomenon to start the charging of said internal battery, changing the charging voltage of said internal battery to charge said internal battery; and with said external power source connected, when starting charging of said battery as a result of mounting of said internal battery on said apparatus, setting said first charging voltage at which the charging capacity of said internal voltage is maximized, and with said external power source connected, when starting charging as a result of recognition of a reduction in the capacity of said internal battery due to its self-discharge, said charging control unit sets said second charging voltage which is lower than said first charging voltage.

* * * * *